United States Patent
Depaepe

(10) Patent No.: US 9,695,701 B2
(45) Date of Patent: Jul. 4, 2017

(54) AIR BLEED SYSTEM FOR AN AXIAL TURBOMACHINE

(71) Applicant: Techspace Aero S.A., Herstal (Milmort) (BE)

(72) Inventor: David Depaepe, Liege (BE)

(73) Assignee: Safran Aero Boosters SA, Herstal (Milmort) (BE)

( * ) Notice: Subject to any disclaimer, the term of this patent is extended or adjusted under 35 U.S.C. 154(b) by 501 days.

(21) Appl. No.: 14/276,212

(22) Filed: May 13, 2014

(65) Prior Publication Data
US 2014/0334915 A1 Nov. 13, 2014

(30) Foreign Application Priority Data
May 13, 2013 (EP) .................................. 13167416

(51) Int. Cl.
| | | |
|---|---|---|
| *F01D 9/02* | (2006.01) | |
| *F02C 6/08* | (2006.01) | |
| *F04D 29/54* | (2006.01) | |
| *F01D 25/18* | (2006.01) | |

(52) U.S. Cl.
CPC ............. *F01D 9/02* (2013.01); *F01D 25/183* (2013.01); *F02C 6/08* (2013.01); *F04D 29/545* (2013.01); *Y02T 50/672* (2013.01)

(58) Field of Classification Search
CPC ........ F01D 9/02; F01D 25/183; F04D 29/545; F02C 6/08; Y02T 50/672
USPC .......................... 60/226.1, 262; 415/175, 176
See application file for complete search history.

(56) References Cited

U.S. PATENT DOCUMENTS

| | | | | |
|---|---|---|---|---|
| 2,619,795 A | * | 12/1952 | Drake | ................... F02K 3/12 60/225 |
| 3,528,241 A | | 9/1970 | Venable et al. | |
| 5,123,242 A | * | 6/1992 | Miller | ................... F02C 7/14 165/300 |
| 6,058,696 A | | 5/2000 | Nikkanen | |
| 2004/0033133 A1 | | 2/2004 | Muny | |
| 2004/0093871 A1 | * | 5/2004 | Burrus | ............. F04D 29/681 60/751 |
| 2005/0235651 A1 | | 10/2005 | Morris | |

(Continued)

FOREIGN PATENT DOCUMENTS

FR 2698406 A1 5/1994

OTHER PUBLICATIONS

European Search Report dated Nov. 18, 2013 for EP 13167416.0.

*Primary Examiner* — Hoang Nguyen
(74) *Attorney, Agent, or Firm* — James E. Walton

(57) ABSTRACT

The present application relates to a bladed stator of a turbomachine compressor, configured to straighten an annular stream of the turbomachine. The stator includes at least one annular wall configured to define the annular stream, a row of blades extending radially from the annular wall and means of pressurizing in communication with the annular stream. The means of pressurizing are configured to pressurize a chamber which is separated from a lubrication housing by a labyrinth seal. The means of pressurizing comprise at least one passage extending through the thickness of the annular wall and connecting with the annular stream. The means of pressurizing further includes at least one scoop in communication with the passage and the annular stream. The scoop is open upstream so as to capture the dynamic pressure of the annular stream.

19 Claims, 3 Drawing Sheets

(56) References Cited

U.S. PATENT DOCUMENTS

2007/0130912 A1\* 6/2007 Kraft .................... F02C 6/08
                                                    60/226.1
2007/0137175 A1\* 6/2007 Moniz ................ F01D 17/105
                                                    60/226.1

\* cited by examiner

AIR BLEED SYSTEM FOR AN AXIAL TURBOMACHINE

This application claims priority under 35 U.S.C. §119 to European Patent Application No. 13167416.0, filed 13 May 2013, titled "Air Bleed System for an Axial Turbomachine," which is incorporated herein by reference for all purposes.

BACKGROUND

1. Field of the Application

The present application relates to the stator of an axial turbomachine. The present application also relates to a turbomachine with means for pressurizing a chamber. More particularly, the present application relates to a turbomachine comprising a compressor provided with a stator with means of pressurization of a chamber.

2. Description of Related Art

A turbomachine has a rotor that can rotate relative to the stator of the turbomachine. When in operation, the rotor turns at several thousand revolutions per minute. Mechanical connections such as bearings are mounted at the interfaces between the stator and the rotor. The bearings enable the mechanical stresses to be absorbed while being designed for the speed of rotation. In order to maintain the optimum operating conditions, these bearings are supplied with lubricating oil. When in operation, this oil can turn into an oil mist.

To prevent the oil from spreading to the rest of the turbomachine, the bearings are mounted in lubrication housings that are generally sealed. The rotor shaft penetrates these housings, creating weak points in terms of sealing the junction between the fixed and moving surfaces. To avoid leaks at these joints, they have labyrinth seals. These seals can limit leakage despite the extreme conditions to which they are subjected.

To further reduce, and preferably eliminate, oil leaks, each labyrinth seal is attached to a pressurized chamber. When the turbomachine is operating, the pressure of the pressurized chamber is greater than that of the attached lubrication housing. The latter is then at a lower pressure than part of its surroundings. In this way, the labyrinth seal located in the interface eliminates all leakage except that from the pressurized chamber towards the lubrication housing; the oil can no longer run away from the latter. In these circumstances, the oil is preserved. It is not likely to spread into the remainder of the turbomachine.

To generate the pressure in the pressurized chamber, the turbomachine has a compressed air bleed system.

Patent FR 2698406 A1 discloses a device for pressurizing a chamber surrounding a bearing lubrication housing. The device comprises air bleed ducts for feeding air to the chamber. The ducts bleed air via orifices located upstream of the respective final stages of the low-pressure compressor and the high-pressure compressor. Thanks to its control system, the device provides air whose pressure and temperature are controlled regardless of the turbomachine's operating modes. However, the pressure of the bleed air is relatively low. This pressure may be too low in some configurations. In addition, the pressure losses in the ducts diminish the available pressure for pressurizing the chamber.

Although great strides have been made in the area of axial turbomachines, many shortcomings remain.

DETAILED DESCRIPTION OF THE PREFERRED EMBODIMENT

Figure 1:
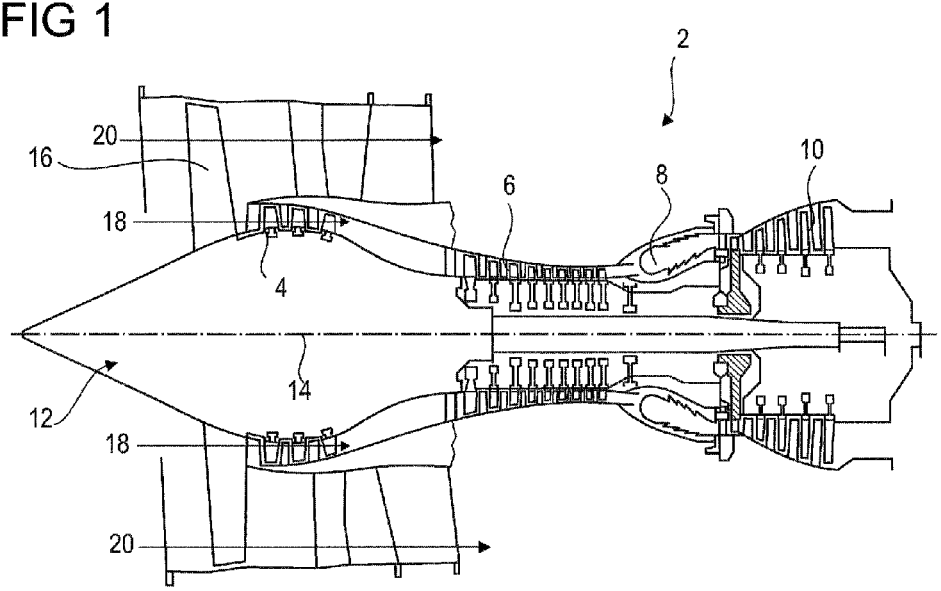
FIG. 1 shows an axial turbomachine in accordance with the present application.

The present application aims to solve at least one of the problems presented by the prior art. The present application also aims to increase the available pressure for pressurizing a chamber of a turbomachine. The present application also aims to maintain the turbomachine's performance.

The present application relates to a bladed stator of an axial turbomachine, comprising at least an annular wall designed to define the annular stream, a row of blades extending radially from the annular wall, and means for pressurizing a chamber, comprising at least one passage passing through the thickness of the annular wall and in communication with the annular stream; wherein the means of pressurizing further comprise at least one scoop on the annular wall on the side of the annular stream and in communication with the passage, the scoop(s) opening upstream so as to capture the dynamic pressure of the said stream.

According to an advantageous embodiment of the present application, the scoop(s) include(s) a separation edge of the annular stream, the said edge extending generally transversely in the direction of flow of the annular stream, remote from, in a radial direction, a corresponding edge of the annular wall, the opening(s) of the scoop(s) extending from the separation edge and the corresponding edge of the wall.

According to an advantageous embodiment of the present application, the scoop(s) comprise(s) a guide wall extending substantially in the direction of flow of the annular stream from the separation edge to the annular wall.

According to an advantageous embodiment of the present application, the scoop(s) is/are located downstream of the blades.

According to an advantageous embodiment of the present application, the blades have an average spacing L4, the scoop extending circumferentially over more than 30% of the average spacing L4, more preferably 60%, more preferably more than 150%.

According to an advantageous embodiment of the present application, the longitudinal section of the scoop(s) has a curved profile, so as to gradually deflect a portion of the annular stream through the annular wall.

According to an advantageous embodiment of the present application, the axial dimension of the passage(s) is/are greater than its/their radial dimension, preferably at least three times.

According to an advantageous embodiment of the present application, the scoop(s) and the annular wall are integral, preferentially the scoop(s) is/are made by punching and drawing the annular wall.

According to an advantageous embodiment of the present application, a portion of the annular wall directly upstream from the opening of the scoop(s) is inclined so as to increase the section of the said opening.

According to an advantageous embodiment of the present application, the annular wall is an inner wall, the stator comprising an outer wall substantially concentric with the first, the blades extending between the said walls.

According to an advantageous embodiment of the present application, the stator comprises an intermediate housing with two intermediate concentric annular walls related to the inner and outer annular walls respectively, the said walls comprising the arms of the housing extending radially, the scoop(s) being arranged in a circumferential direction at and/or upstream of the arms of the housing.

According to an advantageous embodiment of the present application, the passage crosses radially through the annular wall.

According to an advantageous embodiment of the present application, at least at the scoop, the flow of the annular stream has an axial component and a tangential component.

According to an advantageous embodiment of the present application, the annular wall comprises an annular layer of an abradable material, the passage crossing the thickness of the layer of abradable material.

The thicknesses of the annular wall and the abradable layer are measured perpendicular to the annular surface of the annular wall which is in contact with the annular stream.

According to an advantageous embodiment of the present application, the scoop is located downstream of the blades of the last annular row of stator blades, preferably by more than 2.00 mm.

According to an advantageous embodiment of the present application, the means of pressurization are designed to substantially transmit the pressure of the annular stream to the pressurized chamber.

According to an advantageous embodiment of the present application, the chamber is usually closed.

According to an advantageous embodiment of the present application, the chamber is essentially, preferably only, in communication with the scoop(s) and with the means of sealing which ensure tightness.

According to an advantageous embodiment of the present application, the chamber is generally annular.

According to an advantageous embodiment of the present application, any gas flow through the pressurized chamber is essentially centripetal.

According to an advantageous embodiment of the present application, the thickness of the scoop is less than that of the annular wall where it is located.

According to an advantageous embodiment of the present application, the annular wall comprises a metallic material such as titanium, or a composite material or a ceramic material.

According to an advantageous embodiment of the present application, the scoop is longer axially than it is high radially, preferably three times longer, more preferably six times longer.

The present application also relates to an axial compressor comprising at least one bladed stator, wherein the or at least one stator is in accordance with the present application, the compressor preferably comprising several bladed stators including a downstream stator, the downstream stator being in accordance with the present application.

According to an advantageous embodiment of the present application, the compressor comprises a drum and at least one annular row of rotor blades mounted on the drum, the scoop(s) being located axially downstream of the drum, or axially at the drum which has openings arranged axially in line with the scoop and radially inside the annular wall.

The present application also relates to an axial turbomachine comprising a compressor and/or a turbine with at least one stator, wherein the or at least one stator is in accordance with the present application and/or the compressor is in accordance with the present application, preferably the turbomachine comprises a lubrication housing, a pressurizing chamber in communication with scoop(s), means of sealing the junction between the pressurizing chamber and the lubrication housing.

According to an advantageous embodiment of the present application, the scoop(s) is/are located on an inner shell of the stator, preferably the internal shell surrounding the pressurized chamber, more preferably the inner shell comprises means of sealing upstream and downstream of the scoop.

According to an advantageous embodiment of the present application, the scoop may be located on one of the internal shells of the compressor or the turbine.

The present application enables a chamber to be pressurized. It prevents oil leaking from a lubrication housing via a labyrinth seal. The scoop extends radially into the annular stream, which means that use can be made of the dynamic pressure in the flow. It can thus be freely located axially on the compressor, even upstream, since the annular stream already has a high speed downstream of the fan.

The present application provides high static pressure, even when the scoop is located on a low-pressure compressor. The configuration of the present application allows the labyrinth seal to be directly pressurized by increasing the pressure in the drum. It should be noted that, compared to the state of the art, the present application eliminates the need for additional means of compartmentalising the labyrinth seal. Similarly, the pipes connecting the scoop to the means of compartmentalising are superfluous.

The present application allows the static and dynamic pressure of the annular stream to be summed. The configuration of the scoop and the passage can reduce pressure losses. Thus the pressure in the pressurized chamber is maximized for given operating conditions. Even though the scoop is an obstacle to the flow, its impact is negligible since the flow would anyway be disturbed by the arms of the housing located downstream. The performance of the turbomachine is thus maintained.

The scoop can be constructed on an internal stator shell. The presence of the scoop enables its vibratory response to be modified, and possibly promotes vibration damping. The shape of the scoop, which extends radially into the flow, increases the possibilities for damping out vibrations.

In the following description, the terms inner, internal, outer or external refer to a position relative to the axis of rotation of an axial turbomachine.

FIG. 1 shows an axial turbomachine. In this case it is a double-flow turboprop. The turboprop 2 comprises a first compression stage, a so-called low-pressure compressor 4, a second compression stage, a so-called high pressure compressor 6, a combustion chamber 8 and one or more turbine stages 10. In operation, the mechanical power of the turbine 10 is transmitted through the central shaft to the rotor 12 and drives the two compressors 4 and 6. Reduction mechanisms may increase the speed of rotation transmitted to the compressors. Alternatively, the different turbine stages can each be in communication with the compressor stages through concentric shafts. These latter comprise several rotor blade rows associated with stator blade rows. The rotation of the rotor around its axis of rotation 14 generates a flow of air and gradually compresses it up to the inlet of the combustion chamber 10.

An inlet fan, commonly designated a fan 16, is coupled to the rotor 12 and generates an airflow which is divided into a primary flow 18 passing through the various above-mentioned levels of the turbomachine, and a secondary flow 20 passing through an annular conduit (shown in part) along the length of the machine and then rejoins the main flow at the turbine outlet. The primary flow 18 and secondary flow 20 are annular streams and are channelled through the housing of the turbomachine. To this end, the housing has cylindrical walls or shells that can be internal or external.

Figure 2:
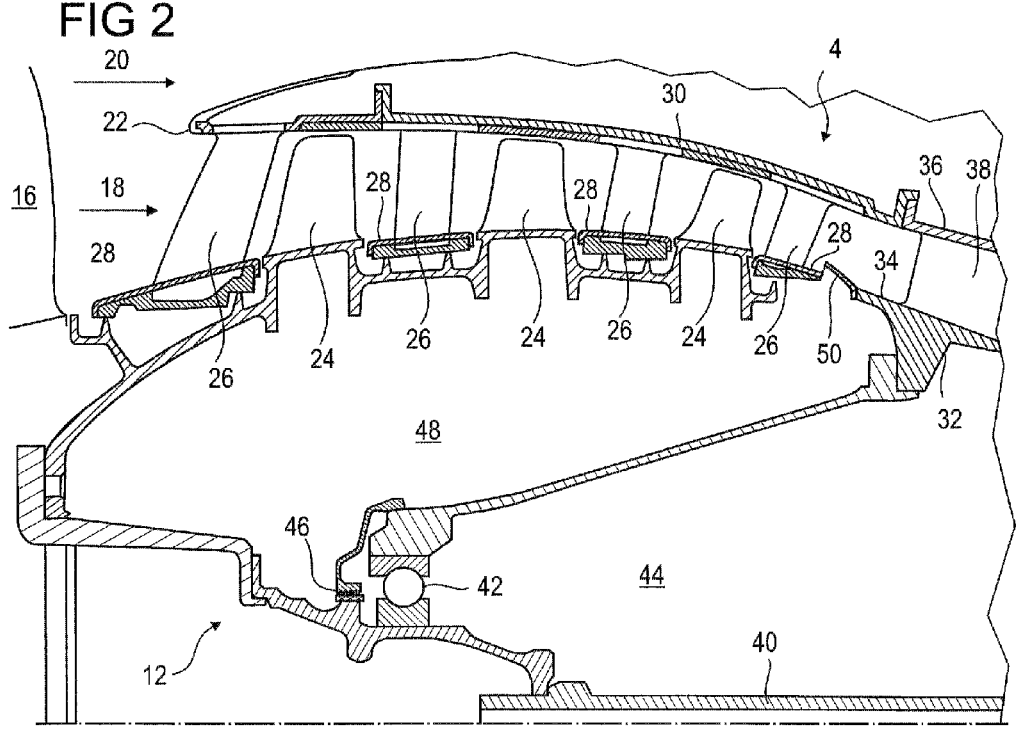
FIG. 2 is a view of a turbomachine compressor according to a first embodiment of the present application.

FIG. 2 is a sectional view of a low-pressure compressor 4 of an axial turbomachine 2 such as that of FIG. 1. Part of the fan 16 can be seen, as can the splitter nose 22 between the primary 18 and secondary 20 airflows. The rotor 12 comprises several rows of rotor blades 24, in this case three.

The low-pressure compressor 4 comprises at least one stator, preferably several stators. In this case, the low-pressure compressor 4 comprises four stators which each contain at least one annular wall and a row of stator blades 26. Preferably, each stator comprises two annular walls, an inner wall 28 and an outer wall 30, which are concentric and coaxial. An outer annular wall 30 may be common to several stators. An inner annular wall 28 can be an internal shell 28 fixed to the inner tips of the stator blades 26 of one annular row. The stators are associated with the fan 16 or a row of rotor blades 24 for straightening the airflow so as to convert the speed of the flow into pressure.

The stator blades 26 extend substantially radially from the outer exterior wall 30, and can be fixed there with a pin. They are equidistant from each other, and have the same angular orientation in the airflow. Advantageously, these blades are identical. Optionally, the spacing between the blades can vary locally as can their angular orientation. The high-pressure compressor 6 may have a similar construction.

The low-pressure compressor 4 comprises a housing, for example an intermediate housing 32 which mechanically and hydraulically connects the low-pressure compressor 4 to the high-pressure compressor 6. The intermediate housing 32 comprises an inner annular intermediate wall 34 and an outer intermediate annular wall 36 which define an intermediate annular intermediate stream. These intermediate walls can be continuous with the interior annular walls 28 and the outer annular walls 30 of the low-pressure compressors 4 and high-pressure compressors 6.

The intermediate housing 32 may include housing arms 38 which extend radially through the intermediate stream. The housing arms 38 are supports that can be designed to absorb the thrust of the fan 16, at least partially. They can be hollow to allow fluid to flow through them or mechanical transmissions to pass through them.

The rotor 12 is mounted on a rotating shaft 40 relative to the housing 32 by means of bearings 42. These bearings 42 are each located in a chamber 44 in which a lubricating oil mist predominates. In order to avoid spreading this oil over the rest of the engine, the lubrication housing 44 is closed and substantially sealed. For this purpose it comprises an upstream seal 46. The upstream seal 46 may be a labyrinth seal 46.

In order to suppress any residual leakage, the upstream seal 46 is in communication with a pressurized chamber 48. This latter can also partially surround the lubrication housing 44. During the operation of the compressor 4, the pressure of the pressurized chamber 48 is greater than that of the lubrication housing 44.

In order to maintain the chamber 48 at a required pressure, at least one of the stators comprises means of pressurizing. The means of pressurizing comprises at least one pressurization scoop 50. Preferably the means of pressurizing comprise a plurality of scoops 50. Advantageously the scoops 50 are axially located at the same level. The scoop(s) 50 may be located axially at one of the compressors. Preferably, the scoop(s) 50 are arranged on the stator downstream of the low-pressure compressor 4. The scoops 50 may be located axially upstream of the housing arms 38.

Figure 3:
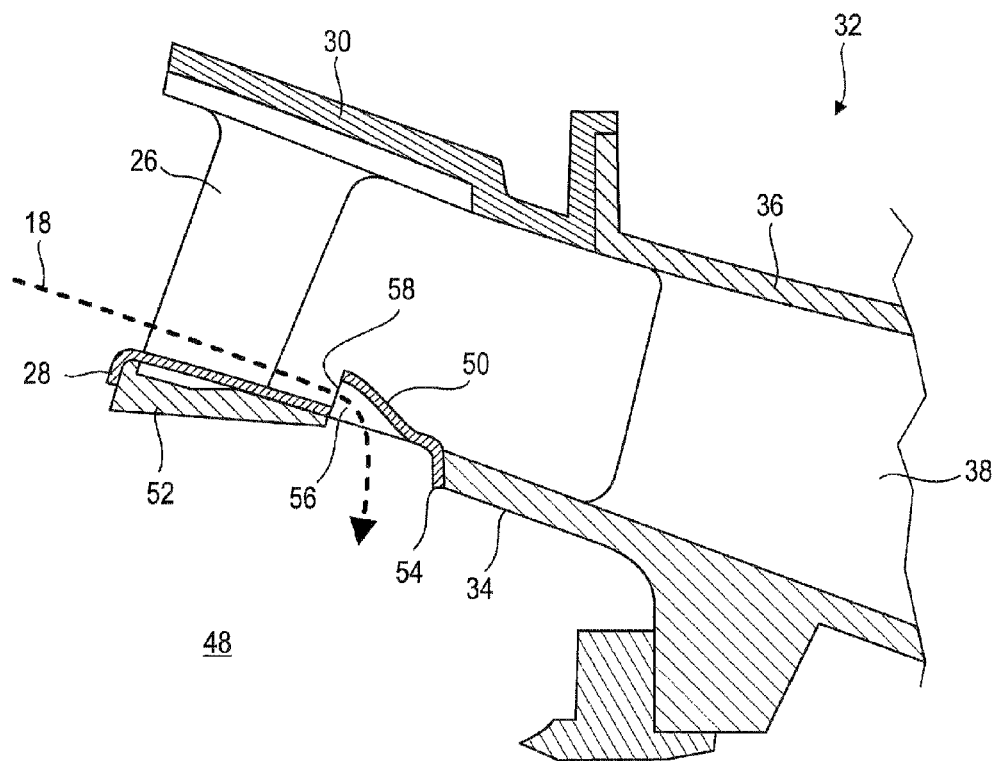
FIG. 3 illustrates a sectional view of a stator according to the first embodiment of the present application.

FIG. 3 shows a downstream portion of the low-pressure compressor 4 according to the present application.

The low-pressure compressor 4 has a stator downstream. The downstream stator has an internal shell 28 with an inverted "U" section. The internal shell 28 has means of sealing. The means of sealing may include an annular layer of abradable material 52, which may be applied to the inner surface of the internal shell 28. The abradable layer 52 is intended to mate abrasively with annular ribs formed on the outer surface of the rotor. The means of sealing of the internal shell 28 may also include a part 54 extending radially and which is pressed against the inner intermediate wall 34 through the intermediate casing 32. These means of sealing are arranged respectively upstream and downstream of the internal shell 28 so as to provide a seal between the inside and outside of the internal shell 28. It is thus designed to provide a sealed surround to the pressurized chamber.

The means of pressurizing comprises a pressurizing scoop 50 located on the internal shell 28. The scoop 50 is in communication with the annular stream 18, preferably directly. The scoop 50 is located downstream of the stator blade 26, at the point where the static pressure in the stator is at its highest axially. It protrudes from the internal shell 28, and is open to the annular stream upstream. In this way, the scoop can capture the dynamic pressure of the annular stream. The scoop 50 enables the static pressure and the dynamic pressure of the annular stream to be summed, and transmits the total pressure to the pressurised chamber 48.

The means of pressurization comprises a passage 56 designed to transmit a pressure. The passage 56 passes through the thickness of the inner shroud 28, preferably directly. The passage 56 is at least partially defined by the scoop 50. The passage 56 is open upstream, in the direction of the local annular stream. The passage 56 can penetrate the abradable layer 52. Thus, the scoop 50 can communicate the pressure of the total annular stream directly to the pressurized chamber 48. It reduces pressure losses and facilitates a possible flow.

The passage 56 has an inlet and an outlet. The area of the outlet is greater than the area of the inlet, preferably at least three times. The inlet extends perpendicular to the outer surface of the internal shell 28, and the outlet is generally flush with the internal shell 28. The outlet forms an opening in the internal shell 28. The smallest cross sectional area of the passage forms a bottleneck 58 or minimum passage section 58 which extends transversely into the annular stream. The minimum passage section 58 extends generally along a plane perpendicular to the velocity vector in the corresponding scoop 50. In this way, the scoop 50 derives maximum benefit from the dynamic pressure of the flow. Note that this minimum passage section 58 enables a part the annular stream to be captured and thus derive benefit from its dynamic pressure.

The scoop may be located on the outer annular wall of the stator. The scoop may also be located on an intermediate annular wall of the intermediate housing, or on one of the arms of the housing.

Figure 4:
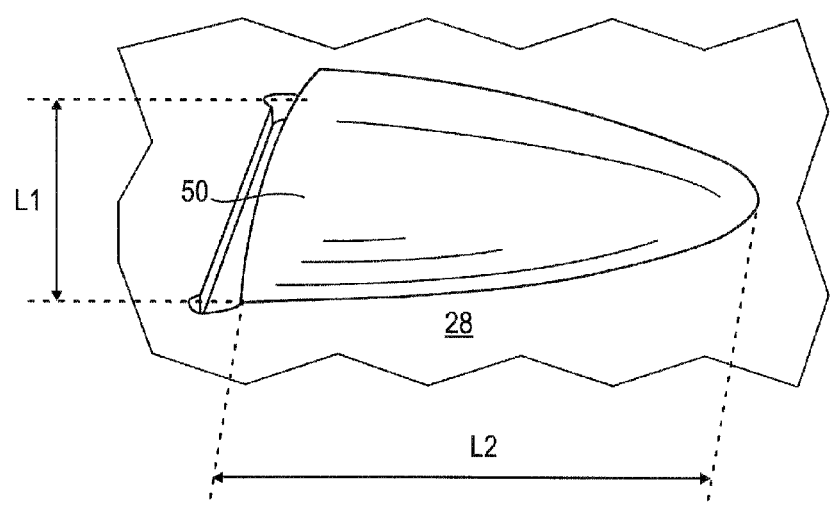
FIG. 4 shows an isometric view of a scoop according to the first embodiment of the present application.

FIG. 4 shows an isometric view of a scoop 50 according to the first embodiment of the present application.

The scoop 50 is curved and designed to progressively deflect part of the annular stream. It has an axial profile and/or a tangential curve. The axial profile of the scoop 50 is axially longer than it is high radially. The scoop 50 has a circumferential width L1 exceeding the axial length L2.

The scoop 50 is formed integrally with the internal shell 28. Advantageously the internal shell is made of a metallic material such as titanium. A shell blank is punched so as to make a slot. Then, it is radially drawn on the downstream side of the slot.

Figure 5:
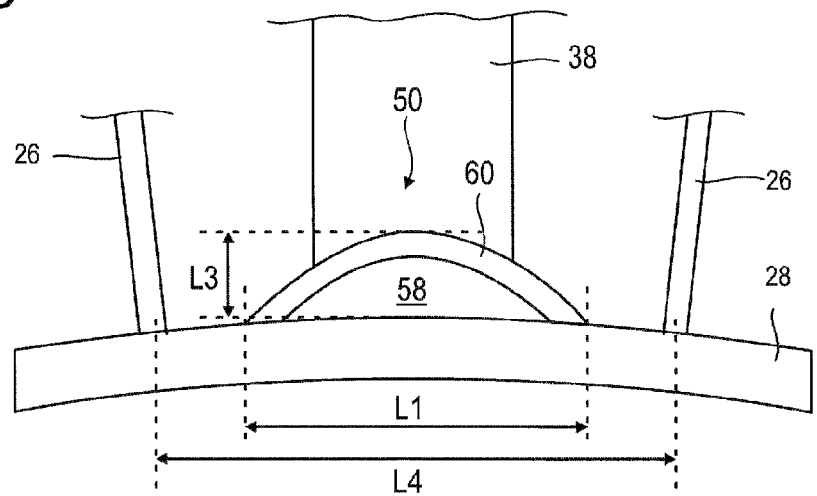
FIG. 5 shows a front view of a part of a stator according to the first embodiment of the present application.

FIG. 5 shows a front view of a part of a stator according to the first embodiment of the present application.

The scoop 50 may be located circumferentially on the stator between two consecutive blades 26. It is preferably circumferentially located on a housing arm 38. Thus, the disturbances it generates are entrained by the primary flow towards the housing arm 38. Due to its thickness and its profile, the housing arm 38 also creates disturbances in the annular stream. These disturbances mix with those generated by the scoop 50. The impact of the mixture of these disturbances on the performance of the engine is less than the sum of the impacts of the disturbances taken separately. The performance of the engine is thus maintained.

The scoop 50 has a separation edge 60 and a leading edge 60. The separation edge 60 separates part of the annular stream from the rest of the flow. It defines the minimum passage section 58. It extends transversely in the direction of the annular stream. It defines axially the profile of the scoop 50. The scoop comprises a guide wall connecting the separation edge 60 to the general radial profile of the annular wall 28.

The scoop 50 has a tangential width L1 greater than its radial height L3, preferably at least twice, more preferably at least five times. The stator blades 26 have an average circumferential spacing L4. The tangential width L1 is greater than 20% of the distance L4, preferably greater than 80%, more preferably greater than 150%.

Figure 6:
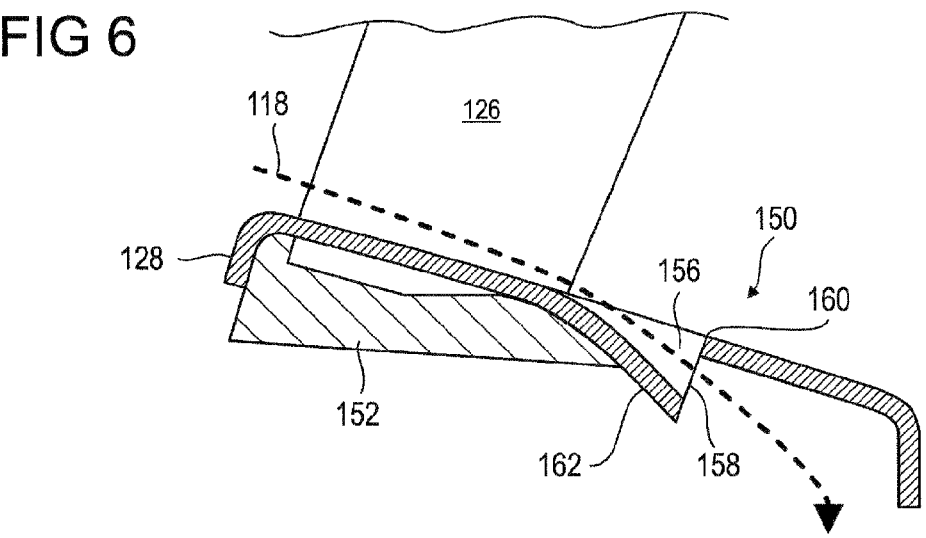
FIG. 6 illustrates a sectional view of a stator according to a second embodiment of the present application.

FIG. 6 shows a sectional view of a stator according to a second embodiment of the present application. FIG. 6 shows the same numbering as in previous figures for the same or similar items with, however, the numbers being incremented by 100. In addition, reference should be made to the description of the preceding figure for similar or equivalent items.

The annular wall 128 includes an inclined wall part 162 opposite the annular stream 118. During operation, a part 118 of the outer annular stream runs along the surface of this inclined wall part 162. Downstream of this part 162, the stator comprises a scoop 150. This scoop 150 may be formed by the annular wall 128. The scoop 150 projects into part of the annular stream that was deflected along the inclined wall part 162. The passage 156 is defined by the scoop 150 and the inclined wall part 162.

The inclined wall part 162 is longer axially than it is high radially, so as to facilitate the change of direction to pass under the annular wall 128. This configuration reduces the disturbances suffered by the annular stream as it passes through the annular wall 128.

Figure 7:
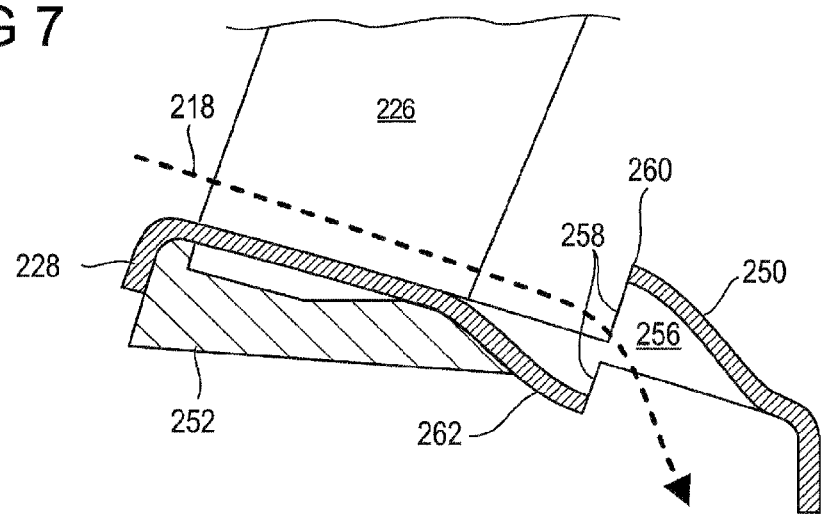
FIG. 7 illustrates a sectional view of a stator according to a third embodiment of the present application.

FIG. 7 shows a sectional view of a stator according to a third embodiment of the present application. FIG. 7 shows the same numbering as in previous figures for the same or similar items with, however, the numbers being incremented by 200. In addition, reference should be made to the description of the preceding figure for similar or equivalent items.

The means of pressurizing comprise a pressurizing scoop 250, and an inclined wall part 262 forming a bulge. The passage 256 and the bulge are in communication axially and/or radially. The scoop 250 and the inclined wall part 262 are located on the annular wall 228. The scoop 250 and the inclined wall part 262 protrude with respect to the annular wall 228 in opposite directions.

This configuration increases the radial height of the minimum passage section 258, and therefore increases the potential flow through it. This increase in height is allowable while reducing any intrusion into the annular stream 218.

I claim:

1. A bladed stator of an axial turbomachine, comprising:
   at least one annular inner wall configured to define an annular stream;
   an outer wall substantially concentric with the annular inner wall;
   a row of blades extending radially between the annular inner wall and the outer wall; and
   means for pressurizing a chamber, the means comprising:
      at least one passage extending through the thickness of the annular inner wall and connecting with the annular stream; and
      at least one scoop on the annular inner wall on the side of the annular stream and in communication with the passage, each scoop being open in the upstream direction, so as to capture the dynamic pressure of the annular stream.

2. The stator in accordance with claim 1, wherein each scoop includes a separation edge of the annular stream, the separation edge extending generally transversely in the direction of the annular stream at a distance in a radial direction from a corresponding edge of the annular inner wall, the opening of each scoop extending between the separation edge and the corresponding edge of the wall.

3. The stator in accordance with claim 2, wherein each scoop comprises:
   a guide wall extending substantially in the direction of flow of the annular stream from the separation edge to the annular inner wall.

4. The stator in accordance with claim 1, wherein each scoop is located downstream of the blades.

5. The stator in accordance with claim 4, wherein the blades have an average spacing L4, the scoop extending circumferentially over more than 30% of the average spacing L4.

6. The stator in accordance with claim 4, wherein the blades have an average spacing L4, the scoop extending circumferentially over more than 60% of the average spacing L4.

7. The stator in accordance with claim 4, wherein the blades have an average spacing L4, the scoop extending circumferentially over more than 150% of the average spacing L4.

8. The stator in accordance with claim 1, wherein the longitudinal section of each scoop has a curved profile, so as to gradually deflect a portion of the annular stream through the annular inner wall.

9. The stator in accordance with claim 1, wherein the axial dimension of the passage is greater than its radial dimension.

10. The stator in accordance with claim 1, wherein the axial dimension of the passage is at least three times greater than its radial dimension.

11. The stator in accordance with claim 1, wherein the scoops are integral with the annular inner wall.

12. The stator in accordance with claim 1, wherein the scoops are produced by punching and drawing the annular inner wall.

13. The stator in accordance with claim 1, wherein a part of the annular inner wall directly upstream of the opening of the scoops is inclined, so as to increase the section of the opening.

14. The stator in accordance with claim 1, further comprising:
an intermediate housing having two intermediate concentric annular walls related to the inner wall and outer annular wall, respectively, the intermediate concentric walls comprising the arms of the housing extending radially, the scoops being arranged in a circumferential direction at and/or upstream of the arms of the housing.

15. An axial compressor, comprising:
at least one bladed stator comprising a downstream bladed stator;
wherein the downstream bladed stator, comprises:
at least one annular inner wall configured to define an annular stream;
an outer wall substantially concentric with the inner wall;
a row of blades extending radially between the annular inner wall and the outer wall; and
means for pressurizing a chamber, the means comprising:
at least one passage extending through the thickness of the annular inner wall and connecting with the annular stream; and
at least one scoop on the annular inner wall on the side of the annular stream and in communication with the passage, each scoop being open in the upstream direction, so as to capture the dynamic pressure of the annular stream.

16. The axial compressor in accordance with claim 15, further comprising:
a drum; and
at least one annular row of rotor blades mounted on the drum, each scoop being located axially downstream of the drum.

17. The axial compressor in accordance with claim 15, further comprising:
a drum; and
at least one annular row of rotor blades mounted on the drum, each scoop being located axially at the level of the drum having openings arranged axially in line with the scoop and radially inside the annular inner wall.

18. An axial turbomachine, comprising:
a compressor comprising:
at least one bladed stator comprising a downstream bladed stator;
wherein the downstream bladed stator comprises:
at least one annular inner wall configured to define an annular stream;
an outer wall substantially concentric with the inner wall;
a row of blades extending radially between the annular inner wall and the outer wall; and
means for pressurizing a chamber, the means comprising:
at least one passage extending through the thickness of the annular inner wall and connecting with the annular stream; and
at least one scoop on the annular inner wall on the side of the annular stream and in communication with the passage, each scoop being open in the upstream direction, so as to capture the dynamic pressure of the annular stream;
a lubrication housing;
a pressurizing chamber in communication with the scoops; and
means of sealing at the junction between the pressurizing chamber and the lubrication housing.

19. The axial turbomachine in accordance with claim 18, wherein the scoops are located on an inner shell of the stator, said shell surrounding the pressurized chamber and including means of sealing upstream and downstream of the scoops.

* * * * *